(12) United States Patent
Farabee et al.

(10) Patent No.: US 7,059,405 B2
(45) Date of Patent: Jun. 13, 2006

(54) METHODS OF TREATING SUBTERRANEAN FORMATIONS USING LOW-MOLECULAR-WEIGHT FLUIDS

(75) Inventors: Mark Farabee, Houston, TX (US); Ruben Alba, Henderson, CO (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 11/033,006

(22) Filed: Jan. 11, 2005

(65) Prior Publication Data

US 2005/0269100 A1 Dec. 8, 2005

Related U.S. Application Data

(63) Continuation of application No. 10/861,829, filed on Jun. 4, 2004.

(51) Int. Cl.
*E21B 43/14* (2006.01)
*E21B 43/267* (2006.01)
*E21B 43/00* (2006.01)
*E21B 47/06* (2006.01)

(52) U.S. Cl. .............................. 166/250.1; 166/250.07; 166/298; 166/313

(58) Field of Classification Search ............. 166/250.1, 166/250.07, 298, 308.1, 313, 55, 55.1
See application file for complete search history.

(56) References Cited

U.S. PATENT DOCUMENTS

| | | | |
|---|---|---|---|
| 2,986,214 A * | 5/1961 | Wiseman, Jr. et al | 175/4.52 |
| 3,118,501 A * | 1/1964 | Kenley | 175/4.52 |
| 3,427,652 A * | 2/1969 | Seay | 166/250.1 |
| 4,524,825 A | 6/1985 | Fore | 166/139 |
| 4,590,995 A | 5/1986 | Evans | 166/127 |
| 4,627,491 A | 12/1986 | Zunkel | 166/126 |
| 4,697,640 A | 10/1987 | Szarka | 166/120 |
| 4,808,925 A | 2/1989 | Baird | 324/221 |
| 4,951,751 A | 8/1990 | Jennings, Jr. | 166/285 |
| 4,962,815 A | 10/1990 | Schultz et al. | 166/387 |
| 5,117,912 A | 6/1992 | Young | 166/305.1 |
| 5,318,123 A * | 6/1994 | Venditto et al. | 166/250.1 |
| 5,330,005 A | 7/1994 | Card et al. | 166/280 |
| 5,363,919 A | 11/1994 | Jennings, Jr. | 166/308 |
| 5,381,864 A | 1/1995 | Nguyen et al. | 166/280 |
| 5,406,078 A | 4/1995 | Jacobson | 250/261 |
| 5,439,055 A | 8/1995 | Card et al. | 166/280 |
| 5,499,678 A | 3/1996 | Surjaatmadja et al. | 166/298 |
| 5,501,275 A | 3/1996 | Card et al. | 166/280 |
| 5,701,954 A | 12/1997 | Kilgore et al. | 166/119 |
| 5,703,286 A | 12/1997 | Proett et al. | 73/152.05 |

(Continued)

OTHER PUBLICATIONS

Knowlton, et al., *Depth Control for Openhole Frac Procedure*, SPE 21294, Society of Petroleum Engineers, 1990.

(Continued)

*Primary Examiner*—George Suchfield
(74) *Attorney, Agent, or Firm*—Robert A. Kent; Baker Botts

(57) ABSTRACT

The present invention relates to systems and methods useful in subterranean treatment operations. Examples of methods of the present invention include methods for fracturing a portion of a subterranean formation penetrated by a well bore; methods of enhancing production from multiple subterranean formations penetrated by a well bore during a single trip through the well bore; and methods of enhancing production, in real time, from multiple subterranean formations penetrated by a well bore during a single trip through the well bore.

34 Claims, 1 Drawing Sheet

U.S. PATENT DOCUMENTS

| | | | | |
|---|---|---|---|---|
| 5,743,334 | A | 4/1998 | Nelson | 166/250.07 |
| 5,765,642 | A | 6/1998 | Surjaatmadja | 166/297 |
| 5,775,415 | A | 7/1998 | Yoshimi | 165/202 |
| 5,787,986 | A | 8/1998 | Weaver et al. | 166/280 |
| 5,833,000 | A | 11/1998 | Weaver et al. | 166/276 |
| 5,839,510 | A | 11/1998 | Weaver et al. | 166/276 |
| 5,853,048 | A | 12/1998 | Weaver et al. | 166/279 |
| 5,865,252 | A * | 2/1999 | van Petegem et al. | 166/297 |
| 5,871,049 | A | 2/1999 | Weaver et al. | 166/276 |
| 5,894,888 | A | 4/1999 | Wiemers et al. | 166/250.1 |
| 5,899,958 | A | 5/1999 | Dowell et al. | 702/6 |
| 5,941,308 | A | 8/1999 | Malone et al. | 166/313 |
| 5,954,133 | A * | 9/1999 | Ross | 166/297 |
| 6,006,838 | A | 12/1999 | Whiteley et al. | 166/306 |
| 6,012,525 | A | 1/2000 | Burleson et al. | 166/297 |
| 6,047,772 | A | 4/2000 | Weaver et al. | 166/276 |
| 6,056,052 | A | 5/2000 | Mullen et al. | 166/134 |
| 6,116,343 | A | 9/2000 | Van Petegem et al. | 166/297 |
| 6,230,805 | B1 | 5/2001 | Vercaemer et al. | 166/300 |
| 6,257,338 | B1 | 7/2001 | Kilgore | 166/387 |
| 6,286,598 | B1 | 9/2001 | Van Petegem et al. | 166/297 |
| 6,286,600 | B1 | 9/2001 | Hall et al. | 166/305.1 |
| 6,296,066 | B1 | 10/2001 | Terry et al. | 175/92 |
| 6,306,800 | B1 | 10/2001 | Samuel et al. | 507/129 |
| 6,394,184 | B1 | 5/2002 | Tolman et al. | 166/281 |
| 6,446,727 | B1 | 9/2002 | Zemlak et al. | 166/308 |
| 6,474,419 | B1 | 11/2002 | Maier et al. | 166/387 |
| 6,488,091 | B1 | 12/2002 | Weaver et al. | 166/300 |
| 6,494,260 | B1 | 12/2002 | Van Petegem et al. | 166/278 |
| 6,497,284 | B1 | 12/2002 | Van Petegem et al. | 166/297 |
| 6,508,307 | B1 | 1/2003 | Almaguer | 166/308 |
| 6,520,255 | B1 | 2/2003 | Tolman et al. | 166/281 |
| 6,543,538 | B1 | 4/2003 | Tolman et al. | 166/284 |
| 6,547,011 | B1 | 4/2003 | Kilgore | 166/387 |
| 6,554,075 | B1 | 4/2003 | Fikes et al. | 166/379 |
| 6,581,699 | B1 | 6/2003 | Chen et al. | 175/61 |
| 6,601,646 | B1 | 8/2003 | Streich et al. | 166/278 |
| 6,604,581 | B1 | 8/2003 | Moake et al. | 166/250.07 |
| 6,613,720 | B1 | 9/2003 | Feraud et al. | 507/200 |
| 6,632,778 | B1 | 10/2003 | Ayoub et al. | 507/202 |
| 6,644,110 | B1 | 11/2003 | Curtis et al. | 73/152.51 |
| 6,667,280 | B1 | 12/2003 | Chang et al. | 507/240 |
| 6,776,239 | B1 * | 8/2004 | Eslinger et al. | 165/308.1 |
| 2002/0125005 | A1 | 9/2002 | Eslinger, et al. | 166/250.17 |
| 2004/0206504 | A1 | 10/2004 | Rosato | 166/298 |

OTHER PUBLICATIONS

Hewett, et al, *Induced Stress Diversion: A Novel Approach to Fracturing Multiple Pay Sands of the NBU Field, Uintah Co., Utah, SPE 39945*, Society of Petroleum Engineers, 1998.

Connell, et al, *Development of a Wireless Coiled Tubing Collar Locator, SPE 54327*, Society of Petroleum Engineers, 1999.

Connell, et al, *High-Pressure/High-Temperature Coiled Tubing Casing Collar Locator Provides Accurate Depth Control for Single-Trip Perforating, SPE 60698*, Society of Petroleum Engineers, 2000.

McConkey, et al, *Integration of Conventional Fracturing, Coiled Tubing, and Retrievable Tool Technology, SPE 60709*, Society of Petroleum Engineers, 2000.

Rodvelt, et al, *Multiseam Coal Stimulation Using Coiled-Tubing Fracturing and a Unique Bottomhole Packer Assembly, SPE 72380*, Soceity of Petroleum Engineers, 2001.

Flowers, et al, *Solutions to Coiled Tubing Depth Control, SPE 74833*, Society of Petroleum Engineers, 2002.

Cobra Jet VCA Acid Stimulation Recommendation dated Apr. 22, 2003.

U.S. Appl. No. 10/807,986, filed Mar. 24, 2004, Willett et al.

Halliburton, *SurgiFrac$^{SM}$Service—Fracture Stimulation Technique for Horizontal Completions in Low-to-Medium-Permeability Reservoirs, HO 3392*, published 2003, Halliburton Communications.

Halliburton, *Cobra Frac$^{SM}$Service, Coiled Tubing Fracturing—Cost-Effective Method for Stimulating Untapped Reserves, HO2319R*, published 2000, Halliburton Energy Services, Inc.

Halliburton, *CobraJet Frac$^{SM}$Service, Cost-effective Technology That Can Help Reduce Cost Per BOE Produced, Shorten Cycle Time and Reduce Capex*, published Halliburton Communications.

Derwent No. XP-002351696 entitled "Open Channel Underground Formation Borehole Interrupt Hydraulic Fracture Abrasion Increase Concentrate", Mar. 16, 1978.

Foreign Counterpart Search Report and Written Opinion Application No. PCT/GB2005/002161, Jun. 1, 2005.

* cited by examiner

METHODS OF TREATING SUBTERRANEAN FORMATIONS USING LOW-MOLECULAR-WEIGHT FLUIDS

CROSS-REFERENCE TO RELATED APPLICATION

This application is a continuation of U.S. patent application Ser. No. 10/861,829, filed Jun. 4, 2004, incorporated by reference herein for all purposes, from which priority is claimed pursuant to 35 U.S.C. § 120.

BACKGROUND OF THE INVENTION

The present invention relates to systems and methods useful in subterranean treatment operations. More particularly, the present invention relates to systems and methods for treating subterranean formations using low-molecular-weight fluids.

Hydrocarbon-bearing subterranean formations penetrated by well bores often may be treated to increase their permeability or conductivity, and thereby facilitate greater hydrocarbon production therefrom. One such production stimulation treatment, known as "fracturing," involves injecting a treatment fluid (e.g., a "fracturing fluid") into a portion of a subterranean formation at a rate and pressure sufficient to create or enhance at least one fracture therein. Fracturing fluids commonly comprise a proppant material (e.g., sand, or other particulate material) suspended within the fracturing fluid, which may be deposited into the created fractures. The proppant material functions, inter alia, to prevent the formed fractures from re-closing upon termination of the fracturing operation. Upon placement of the proppant in the formed fractures, conductive channels may remain within the zone or formation, through which channels produced fluids readily may flow to the well bore upon completion of the fracturing operation.

Because most fracturing fluids should suspend proppant material, the viscosity of fracturing fluids often has been increased through inclusion of a viscosifier. After a viscosified fracturing fluid has been pumped into the formation to create or enhance at least one fracture therein, the fracturing fluid generally may be "broken" (e.g., caused to revert into a low viscosity fluid), to facilitate its removal from the formation. The breaking of viscosified fracturing fluids commonly has been accomplished by including a breaker within the fracturing fluid.

Conventional fracturing fluids usually are water-based liquids containing a viscosifier that comprises a polysaccharide (e.g., guar gum). Guar, and derivatized guar polymers such as hydroxypropylguar, are water-soluble polymers that may be used to create viscosity in an aqueous fracturing fluid, and that readily may be crosslinked to further increase the viscosity of the fracturing fluid. While the use of gelled and crosslinked polysaccharide-containing fracturing fluids has been successful, such fracturing fluids often have not been thermally stable at temperatures above about 200° F. That is, their viscosities may decrease over time at high temperatures. To offset the decreased viscosity, the concentration of the viscosifier often may be increased, which may result in, inter alia, increased costs and increased friction pressure in the tubing through which the fracturing fluid is injected into a subterranean formation. This may increase the difficulty of pumping the fracturing fluids. Thermal stabilizers, such as sodium thiosulfate, often have been included in fracturing fluids, e.g., to scavenge oxygen and thereby increase the stabilities of fracturing fluids at high temperatures. However, the use of thermal stabilizers also may increase the cost of the fracturing fluids.

Certain types of subterranean formations, such as certain types of shales and coals, may respond unfavorably to fracturing with conventional fracturing fluids. For example, in addition to opening a main, dominant fracture, the fracturing fluid may further invade numerous natural fractures (or "butts" and "cleats," where the formation comprises coal) that may intersect the main fracture, which may cause conventional viscosifiers within the fracturing fluid to invade intersecting natural fractures. When the natural fractures re-close at the conclusion of the fracturing operation, the conventional viscosifiers may become trapped therein, and may obstruct the flow of hydrocarbons from the natural fractures to the main fracture. Further, even in circumstances where the viscosifier does not become trapped within the natural fractures, a thin coating of gel nevertheless may remain on the surface of the natural fractures after the conclusion of the fracturing operation. This may be problematic, inter alia, where the production of hydrocarbons from the subterranean formation involves processes such as desorption of the hydrocarbon from the surface of the formation. Previous attempts to solve these problems have involved the use of less viscous fracturing fluids, such as non-gelled water. However, this may be problematic, inter alia, because such fluids may prematurely dilate natural fractures perpendicular to the main fracture—a problem often referred to as "near well bore fracture complexity," or "near well bore tortuosity." This may be problematic because the creation of multiple fractures, as opposed to one or a few dominant fractures, may result in reduced penetration into the formation, e.g., for a given injection rate, many short fractures may be created rather than one, or a few, lengthy fracture(s). This may be problematic because in low permeability formations, the driving factor to increase productivity often is the fracture length. Furthermore, the use of less viscous fracturing fluids also may require excessive fluid volumes, and/or excessive injection pressure. Excessive injection pressure may frustrate attempts to place proppant into the fracture, thereby reducing the likelihood that the fracturing operation will increase hydrocarbon production.

It often is desirable to selectively treat hydrocarbon formations to extract hydrocarbons therefrom while isolating the formation from other intervals in a well bore. Such selective treatment operations may include perforating well casing that may be installed in the well bore, and introducing a fracturing fluid through tubing into a tool assembly in the casing, and to a ported sub, or the like, connected in the tool assembly. The fracturing fluid generally discharges from the ported sub at a relatively high pressure, and passes through the perforations in the well casing and into the formation to create or enhance at least one fracture therein. Often, the formation may be isolated by setting packers above, and below, the ported sub to isolate the zone during the fracturing operation.

However, these types of techniques may be problematic. For example, the use of a packer above the ported sub may create a high pressure differential between the formation and the area of the well above the packer, which may cause the packer to unseat during operation, possibly resulting in an unsuccessful fracture treatment, tool damage, and loss of well control.

Also, the introduction of fracturing fluid through the tubing and tool assembly may create additional problems, not the least of which may be the fluid friction created by the flow of the fracturing fluid, which may lead to mechanical failure of both the tubing and tool assembly.

SUMMARY OF THE INVENTION

The present invention relates to systems and methods useful in subterranean treatment operations. More particularly, the present invention relates to systems and methods for treating subterranean formations using low-molecular weight treatment fluids.

An example of a method of the present invention is a method for fracturing a portion of a subterranean formation penetrated by a well bore comprising: placing a tool assembly in the well bore to form an annulus between the tool assembly and the walls of the well bore; passing a low-molecular-weight fluid through the tool assembly and towards the walls of the well bore to form openings in the walls; and permitting a low-molecular-weight fluid to flow through the openings and into the formation to create or enhance at least one fracture therein.

Another example of a method of the present invention is a method for fracturing a portion of a subterranean formation penetrated by a well bore, comprising: placing a tool assembly in the well bore to form an annulus between the tool assembly and the walls of the well bore; placing a low-molecular-weight fluid into the annulus for flowing into the formation to create or enhance at least one fracture therein; and forming a seal across the annulus to restrict fluid flow in the annulus downstream of the seal and to permit or enhance flow of the low-molecular-weight fluid through the annulus and into the formation.

Another example of a method of the present invention is a method of enhancing production from multiple subterranean formations penetrated by a well bore during a single trip through the well bore, comprising: inserting a tool assembly into the well bore adjacent a desired location in a formation; placing a low-molecular-weight fluid into the formation so as to create or enhance at least one fracture in the formation; relocating the tool assembly within the well bore adjacent another desired location in the same, or different, formation; and repeating the step of placing a low-molecular-weight fluid into the formation so as to create or enhance at least one fracture in the formation.

Yet another example of a method of the present invention is a method of enhancing production from multiple subterranean formations penetrated by a well bore comprising a casing during a single trip through the well bore, comprising: inserting a tool assembly into the casing adjacent a desired location in a formation; forming openings in the casing at the desired location; passing a low-molecular-weight fluid through the openings into the formation so as to create or enhance at least one fracture in the formation; relocating the tool assembly within the casing to another desired location in the same, or different, formation; and repeating the steps of forming openings in the casing and passing the low-molecular-weight fluid through the openings into the formation so as to create or enhance at least one fracture in the formation.

Still another example of a method of the present invention is a method of enhancing production, in real time, from multiple subterranean formations penetrated by a well bore during a single trip through the well bore, comprising: inserting a tool assembly into the well bore adjacent a desired location in a formation; placing a low-molecular-weight fluid into the formation so as to create or enhance at least one fracture in the formation; determining, in real time, at least one parameter related to the creation or enhancement of the fracture; relocating the tool assembly within the well bore to another desired location in the same, or different, formation; and repeating the step of placing a low-molecular-weight fluid into the formation so as to create or enhance at least one fracture in the formation.

Yet another method of the present invention is a method of reducing the cost of enhancing production from multiple formations penetrated by a well bore by stimulating multiple formations, on a single trip through the well bore, with a fluid that minimizes damage to the formation comprising: inserting a tool assembly into the well bore adjacent a desired location in a formation; placing a low-molecular-weight fluid into the formation so as to create or enhance at least one fracture in the formation; relocating the tool assembly within the well bore to another desired location in the same, or different, formation; and repeating the step of placing a low-molecular-weight fluid into the formation so as to create or enhance at least one fracture in the formation; wherein the low-molecular-weight fluid enhances the regain permeability of the formation.

The features and advantages of the present invention will be readily apparent to those skilled in the art upon a reading of the description of the preferred embodiments that follows.

BRIEF DESCRIPTION OF THE DRAWINGS

A more complete understanding of the present disclosure and advantages thereof may be acquired by referring to the following description taken in conjunction with the accompanying drawing, wherein.

Figure 1:
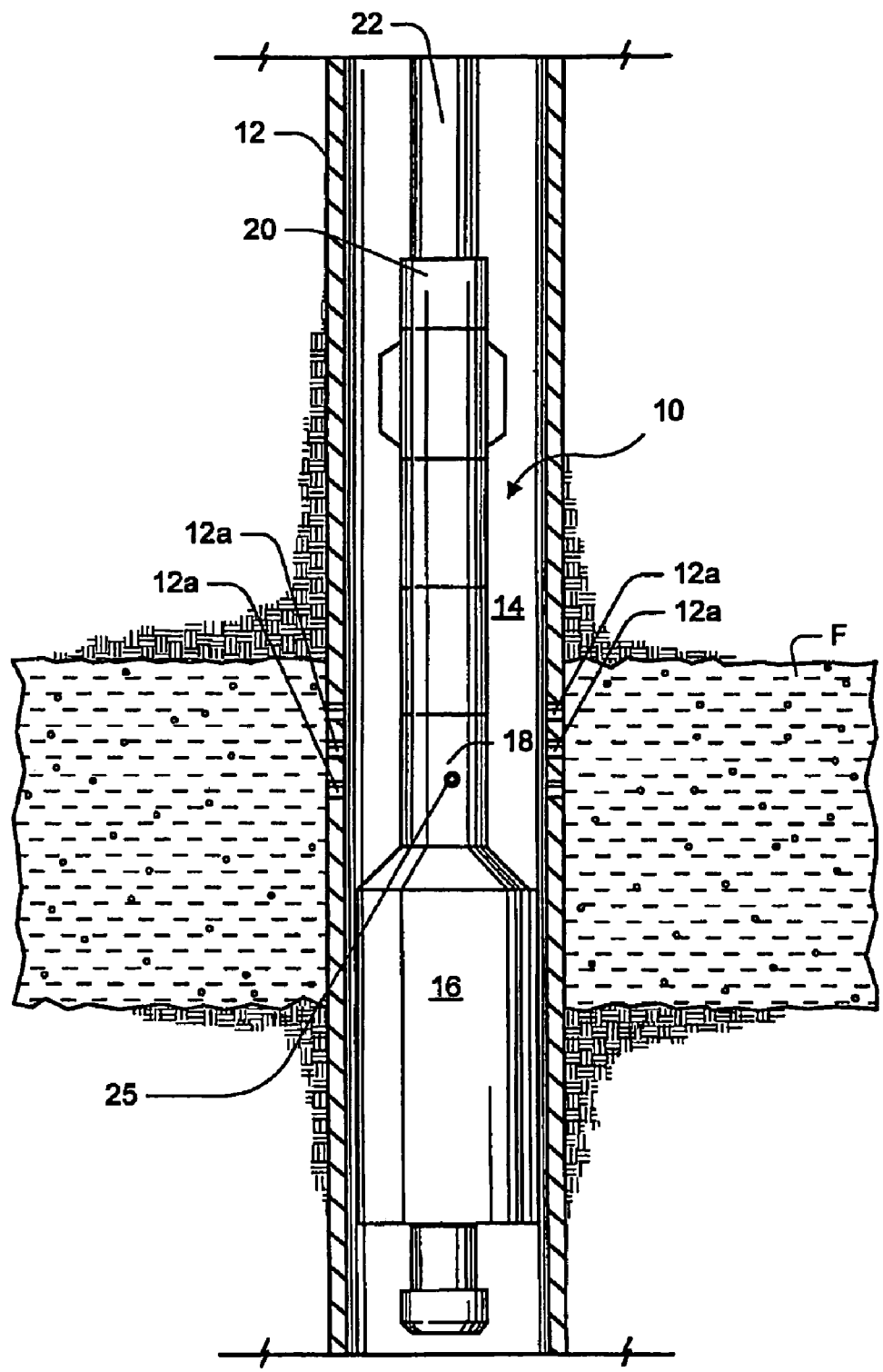
FIG. 1 is a partial sectional/partial diagrammatic view of a system according to an embodiment of the present invention.

While the present invention is susceptible to various modifications and alternative forms, specific embodiments thereof have been shown in the drawing and are herein described. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DESCRIPTION OF EMBODIMENTS

The present invention relates to systems and methods useful in subterranean treatment operations. More particularly, the present invention relates to systems and methods for treating subterranean formations using low-molecular-weight fluids. As referred to herein, the term "low-molecular-weight fluid" is defined to mean a fluid that has an average molecular weight of about 1,000,000 or less. Certain embodiments of the low-molecular-weight fluids useful in accordance with the present invention may have a viscosity, measured at a reference temperature of about 25° C., of at least about 2 cP; such viscosity may be measured on, for example, a Fann Model 35 viscometer, or the like. Certain other embodiments of low-molecular-weight fluids useful with the present invention may have a lower viscosity, such as, for example, when the low-molecular-weight fluid is water.

In certain embodiments of the present invention, the use of a low-molecular-weight fluid in the methods and systems of the present invention may result in, among other things, improved cleanup of the low-molecular-weight fluid at the conclusion of the treatment operation, and reduced loss of the low-molecular-weight fluid into the subterranean formation during the treatment operation. The subterranean formation also may exhibit improved "regain permeability" upon the conclusion of the treatment operation. As referred to herein, the term "regain permeability" will be understood to mean the degree to which the permeability of a formation that has been exposed to a treatment fluid approaches the original permeability of the formation. For example, a determination that a subterranean formation evidences "100% regain permeability" at the conclusion of a treatment operation indicates that the permeability of the formation, post-operation, is equal to its permeability before the treatment operation. In certain embodiments of the present invention, the methods and systems of the present invention may permit, inter alia, highly accurate, "pinpoint" placement of a fracture that has been created or enhanced through the injection of a low-molecular-weight fluid at a desired location in a reservoir.

In certain embodiments of the present invention, the low-molecular-weight fluid may comprise an acid system. The acid system may be polymer-based or nonpolymer-based. In certain embodiments, the acid system may comprise a viscosifier (sometimes referred to as a "gelling agent."). Where the acid system comprises a viscosifier, a broad variety of viscosifiers may be used, including, but not limited to, emulsifiers and surfactants. Examples of suitable viscosifiers include, but are not limited to, those that are commercially available from Halliburton Energy Services, Inc., under the trade names SGA-HT, SGA-I, and SGA-II. In certain embodiments wherein the low-molecular-weight fluid used in the methods and systems of the present invention is an acid system that comprises a viscosifier, the viscosifier may be present in the acid system in an amount in the range of from about 0.001% to about 0.035% by volume. Examples of other acid systems that may be suitable include, but are not limited to, a hydrochloric acid based delayed carbonate acid system that is commercially available from Halliburton Energy Services, Inc., under the trade name CARBONATE 20/20, and a hydrofluoric acid based delayed carbonate acid system that is commercially available from Halliburton Energy Services, Inc., under the trade name SANDSTONE 2000.

Another example of a suitable low-molecular-weight fluid that may be used with the methods of the present invention is water. Generally, the water may be from any source.

Another example of a suitable low-molecular-weight fluid is described in U.S. Pat. No. 6,488,091, the relevant disclosure of which is hereby incorporated by reference. Such low-molecular-weight fluid has an average molecular weight in the range of from about 100,000 to about 250,000, generally has a viscosity (measured at a reference temperature of about 25° C. on, for example, a Fann Model 35 viscometer, or the like) of at least about 8 cP, and generally comprises water, a substantially fully hydrated depolymerized polymer, and a crosslinking agent for crosslinking the substantially fully hydrated depolymerized polymer. The water can be selected from fresh water, unsaturated salt water (e.g., brines and seawater), and saturated salt water. The substantially fully hydrated depolymerized polymer in the low-molecular-weight fluid may be, inter alia, a depolymerized polysaccharide. In certain embodiments, the substantially fully hydrated depolymerized polymer is a substantially fully hydrated depolymerized guar derivative polymer selected from the group consisting of hydroxypropylguar, carboxymethylhydroxypropylguar, carboxymethylguar, hydroxyethylguar and carboxymethylhydroxyethylguar. In certain embodiments, the substantially fully hydrated depolymerized polymer is substantially fully hydrated depolymerized hydroxypropylguar. Generally, where the low-molecular-weight fluid comprises water, a substantially fully hydrated depolymerized polymer, and a crosslinking agent, the substantially fully hydrated depolymerized polymer is present in the low-molecular-weight fluid in an amount in the range of from about 0.2% to about 5% by weight of the water therein.

Optionally, the low-molecular-weight fluids suitable for use with the present invention may further comprise a crosslinking agent. A broad variety of crosslinking agents may be suitable for use in accordance with the methods and systems of the present invention. For example, where the low-molecular-weight fluids useful in the present invention comprise water, along with a substantially fully hydrated depolymerized polymer, suitable crosslinking agents include, but are not limited to, boron-based compounds (e.g., boric acid, ulexite, colemanite, disodium octaborate tetrahydrate, sodium diborate and pentaborates). The crosslinking of the substantially fully hydrated depolymerized polymer that may be achieved by these crosslinking agents generally is fully reversible (e.g., the crosslinked, substantially fully hydrated polymer easily may be delinked if and when desired). Metal-based crosslinking agents also may be suitable, bearing in mind that crosslinking of the substantially fully hydrated depolymerized polymer that may be achieved by these crosslinking agents generally is less reversible. Examples of suitable metal-based crosslinking agents include, but are not limited to, compounds that can supply zirconium IV ions (e.g., zirconium lactate, zirconium lactate triethanolamine, zirconium carbonate, zirconium acetylacetonate and zirconium diisopropylamine lactate), compounds that can supply titanium IV ions (e.g., titanium ammonium lactate, titanium triethanolamine, and titanium acetylacetonate), aluminum compounds (e.g., aluminum lactate or aluminum citrate), or compounds that can supply antimony ions. In certain embodiments, the crosslinking agent is a borate compound. The exact type and amount of crosslinking agent, or agents, used depends upon, inter alia, the specific substantially fully hydrated depolymerized polymer to be crosslinked, formation temperature conditions and other factors known to those individuals skilled in the art. Where included, the optional crosslinking agent may be present in the low-molecular-weight fluid in an amount in the range of from about 50 ppm to about 5000 ppm active crosslinker.

Optionally, when the low-molecular-weight fluids useful with this invention are used to carry out a fracture stimulation procedure, proppant material may be included in at least a portion of the low-molecular-weight fluid as it is pumped into the subterranean formation to be fractured and into fractures created therein. For example, the proppant material may be metered into the low-molecular-weight fluid as the low-molecular-weight fluid is formed. The quantity of proppant material per volume of low-molecular-weight fluid can be changed, as desired, in real time. Examples of proppant material that may be utilized include, but are not limited to, resin-coated or uncoated sand, sintered bauxite, ceramic materials or glass beads. Suitable materials are commercially available from Carboceramics, Inc., of Irving, Tex.; Sintex Minerals & Services, Inc., of Houston, Tex.; and Norton-Alcoa Proppants, of Fort Smith, Ark. Examples of intermediate strength ceramic proppants that may be suitable include, but are not limited to, EconoProp®, Carbo Lite®, Carbo Prop®, Interprop®, Naplite®, and Valuprop®. Examples of high strength ceramic proppants include, but are not limited to, Carbo HSP®, Sintered Bauxite and SinterBall®. Where included, the proppant material utilized may be present in the low-molecular-weight fluid in an amount in the range of from about 0.25 to about 24 pounds of proppant material per gallon of the low-molecular-weight fluid.

Optionally, in certain embodiments wherein the low-molecular-weight fluid comprises water, a crosslinking agent, and a substantially fully hydrated depolymerized polymer, a pH-adjusting compound for adjusting the pH of the low-molecular-weight fluid to the optimum pH for crosslinking may be included in the low-molecular-weight treating fluid. The pH-adjusting compound can be selected from sodium hydroxide, potassium hydroxide, lithium hydroxide, fumaric acid, formic acid, acetic acid, hydrochloric acid, acetic anhydride and the like. In certain embodiments, the pH-adjusting compound is sodium hydroxide. Where included, the pH-adjusting compound may be present in the low-molecular-weight fluid in an amount in the range of from about 0.01% to about 0.3% by weight of the water in the low-molecular-weight fluid. In certain embodiments wherein the pH-adjusting compound comprises a borate compound, the pH-adjusting compound is utilized to elevate the pH of the low-molecular-weight fluid to above about 9. At that pH, the borate compound crosslinking agent crosslinks the short chain hydrated polymer segments. When the pH of the crosslinked low-molecular-weight fluid falls below about 9, the crosslinked sites are no longer crosslinked. Thus, when the crosslinked low-molecular-weight fluid contacts the subterranean formation being treated, the pH may be lowered to some degree, which may begin the breaking process.

Optionally, in certain embodiments wherein the low-molecular-weight fluid comprises water, a crosslinking agent, and a substantially fully hydrated depolymerized polymer, the low-molecular-weight fluid may comprise a delayed delinker capable of lowering the pH of the low-molecular-weight fluid. In certain embodiments, the presence of the delayed delinker in the low-molecular-weight fluid may cause the low-molecular-weight fluid to completely revert to a thin fluid at a desired time. Examples of delayed delinkers that may be utilized include, but are not limited to, various lactones, esters, encapsulated acids and slowly-soluble acid-generating compounds, oxidizers which produce acids upon reaction with water, water-reactive metals such as aluminum, lithium and magnesium and the like. In certain embodiments, the delayed delinker comprises an ester. Where included, the delayed delinker may be present in the low-molecular-weight fluid in an amount in the range of from about 0.01% to about 1% by weight of the water therein. Alternatively, any of the conventionally used delayed breakers employed with metal ion crosslinkers can be utilized, for example, oxidizers such as sodium chlorite, sodium bromate, sodium persulfate, ammonium persulfate, encapsulated sodium persulfate, potassium persulfate, or ammonium persulfate, and the like, as well as magnesium peroxide, and encapsulated acids. Enzyme breakers that may be employed include alpha and beta amylases, amyloglucosidase, invertase, maltase, cellulase and hemicellulase. The specific breaker or delinker utilized, whether or not it is encapsulated, as well as the amount thereof employed will depend upon factors including, inter alia, the breaking time desired, the nature of the polymer and crosslinking agent, and formation characteristics and conditions.

Optionally, the low-molecular-weight fluid also may include a surfactant. The inclusion of a surfactant in the low-molecular-weight fluid may, inter alia, prevent the formation of emulsions between the low-molecular-weight fluid and subterranean formation fluids contacted by the low-molecular-weight fluid. Examples of such surfactants include, but are not limited to, alkyl sulfonates, alkyl aryl sulfonates (e.g., alkyl benzyl sulfonates such as salts of dodecylbenzene sulfonic acid), alkyl trimethylammonium chloride, branched alkyl ethoxylated alcohols, phenol-formaldehyde anionic resin blends, cocobetaines, dioctyl sodium sulfosuccinate, imidazolines, alpha olefin sulfonates, linear alkyl ethoxylated alcohols, trialkyl benzylammonium chloride and the like. In certain embodiments, the surfactant may comprise methanol. An example of a suitable surfactant is commercially available from Halliburton Energy Services, Inc., under the trade name "LO-SURF 300." In certain embodiments, the surfactant comprises dodecylbenzene sulfonic acid salts. Where included, the surfactant generally is present in the low-molecular-weight fluid in an amount in the range of from about 0.001% to about 0.5% by weight of the water therein.

Optionally, the low-molecular-weight fluid also may include a clay stabilizer selected, for example, from the group consisting of potassium chloride, sodium chloride, ammonium chloride, tetramethyl ammonium chloride, and the like. An example of a suitable clay stabilizer is commercially available from Halliburton Energy Services, Inc., under the trade name "CLA-STA XP." In certain embodiments, the clay stabilizer is potassium chloride or tetramethyl ammonium chloride. Where included, the clay stabilizer is generally present in the low-molecular-weight fluid in an amount in the range of from about 0.001% to about 1% by weight of the water therein.

Optionally, the low-molecular-weight fluid may comprise a fluid loss control agent. Examples of fluid loss control agents that may be used include, but are not limited to, silica flour, starches, waxes, diesels, and resins. An example of a suitable silica flour is commercially available from Halliburton Energy Services, Inc., under the trade name "WAC-9." An example of a suitable starch is commercially available from Halliburton Energy Services, Inc., under the trade name "ADOMITE AQUA." Where included, the fluid loss control agent may be present in the low-molecular-weight fluid in an amount in the range of from about 0.01% to about 1% by weight of water therein.

Optionally, the low-molecular-weight fluid also may include compounds for retarding the movement of the proppant within the created or enhanced fracture. For example, materials in the form of fibers, flakes, ribbons, beads, shavings, platelets and the like that comprise glass, ceramics, carbon composites, natural or synthetic polymers, resins, or metals and the like can be admixed with the low-molecular-weight fluid and proppant. A more detailed description of such materials is disclosed in, for example, U.S. Pat. Nos. 5,330,005; 5,439,055; and 5,501,275, the relevant disclosures of which are incorporated herein by reference. Examples of suitable epoxy resins include those that are commercially available from Halliburton Energy Services, Inc., under the trade names "EXPEDITE" and "SAND WEDGE." Alternatively, or in addition to the prior materials, a material comprising a tackifying compound may be admixed with the low-molecular-weight fluid or the proppant particulates to coat at least a portion of the proppant particulates, or other solid materials identified above, such that the coated material and particulates adjacent thereto will adhere together to form agglomerates that may bridge in the created fracture to prevent particulate flowback. The tackifying compound also may be introduced into the formation with the low-molecular-weight fluid before or after the introduction of the proppant particulates into the formation. The coated material may be effective in inhibiting the flowback of fine particulate in the proppant pack having a size ranging from about that of the proppant to less than about 600 mesh. The coated proppant or other material is effective in consolidating fine particulates in the formation in the form of agglomerates to prevent the movement of the fines during production of the formation fluids from the well bore subsequent to the treatment. A more detailed description of the use of such tackifying compounds and methods of use thereof are disclosed in U.S. Pat. Nos. 5,775,415; 5,787,986; 5,833,000; 5,839,510; 5,871,049; 5,853,048; and 6,047,772, the relevant disclosures of which are incorporated herein by reference thereto.

Optionally, additional additives may be included in the low-molecular-weight fluids including, but not limited to, scale inhibitors, demulsifiers, bactericides, breakers, activators and the like. An example of a suitable scale inhibitor is commercially available from Halliburton Energy Services, Inc., under the trade name "SCA 110." An example of a suitable breaker is commercially available from Halliburton Energy Services, Inc., under the trade name "VICON." Another example of a suitable breaker is commercially available from Halliburton Energy Services, Inc., under the trade name "HMP DE-LINK." Examples of suitable bactericides are commercially available from Halliburton Energy Services, Inc., under the trade names "BE-3" and "BE-6."

In one embodiment, the present invention provides a system that advantageously may be used with a low-molecular-weight fluid, such as one that has been disclosed herein, to perform a variety of functions in a subterranean formation. Referring now to FIG. 1, a tool assembly is referred to, in general, by the reference numeral 10 and is shown installed in a casing 12 disposed in a well. Though FIG. 1 illustrates the deployment of tool assembly 10 in a well bore having casing disposed therein, it will be understood that the systems and methods of the present invention also may be used in uncased, "open hole" well bores. In certain embodiments, the well in which tool assembly 10 is disposed may be a vertical well. In certain embodiments, the well may be a deviated well or a horizontal well. The casing 12 intersects a subterranean formation F. Pursuant to the methods of the present invention, the tool assembly 10 may be lowered to a predetermined depth in the casing 12 near the formation F. A connector 20 generally is connected to a section of coiled or jointed tubing 22, which may be lowered into the well from the ground surface to locate the tool assembly 10 at a desired depth in the well in the vicinity of the formation F. The tool assembly 10 defines, with the casing 12, an annulus 14. In certain embodiments of the present invention where tool assembly is used in an uncased, open hole well bore, an annulus similarly would be formed, defined by tool assembly 10 and the walls of the well bore.

A packer 16 and a jet perforating sub 18 are connected in the tool assembly 10 in any conventional manner with the packer 16 extending downstream, or below, the sub 18. The packer 16 may be of any conventional design, including, but not limited to, those disclosed in assignee's U.S. Pat. Nos. 4,524,825, 4,590,995, 4,627,491, 4,697,640, 4,962,815, 5,701,954, and 6,056,052, the relevant disclosures of which are incorporated herein by reference. Although not shown in detail, it will be understood that the packer 16 is adapted to form a seal across the annulus 14 and, as such, the packer 16 includes at least one packer element. In an embodiment, the at least one packer element may be in the form of a torus fabricated from an expandable material surrounding a mandrel. The at least one packer element may be held in place in any conventional manner. The packer 16 also generally includes a mechanism or mechanisms to anchor the packer 16 in a position adjacent or near the formation F. After the packer 16 has been anchored in a desired position, the at least one packer element may be expanded against the casing 12 to seal against axial fluid flow through the annulus 14 downstream of the packer 16.

The sub 18 can be of any conventional design, including, but not limited to, those disclosed in assignee's U.S. Pat. Nos. 5,499,678 and 5,765,642, the relevant disclosures of which are incorporated herein by reference. The sub 18 contains a plurality of jet openings 25 for discharging a low-molecular-weight fluid through the casing 12, through any cement between the casing 12 and the well, and into the formation F. In certain embodiments, sub 18 may be moved within a well bore so that the discharge, through the jet openings 25, of the low-molecular-weight fluid may cut openings in the casing and the formation F that have a particular shape. In certain embodiments, the jet openings 25 may be angled in the same direction, or in different directions. In certain embodiments, the jet openings 25 may be aligned in a straight line, or may be offset from each other. For example, in certain embodiments, the jet openings 25 may be offset by about 45°, and also may be angled in different directions. In certain embodiments, the jet openings 25 may be offset from each other by about 120°, and may be linearly spaced about 1 foot from each other.

In certain embodiments of the present invention, the coiled or jointed tubing 22 may comprise composite pipe having one or more communication lines located within it. A suitable composite pipe that comprises such communication lines is commercially available from Halliburton Energy Services, Inc., under the trade name "SMART PIPE." In certain embodiments, the composite pipe may comprise communication lines that are capable of conveying power and bidirectional communication, among other things.

Optionally, an operator may elect to employ a pressure sensor (not shown) as part of the tool assembly 10. A wide variety of pressure sensors may be used with the tool assemblies of the present invention. In certain embodiments, the pressure sensor may be capable of storing data that may be generated during a subterranean operation until a desired time, e.g., until the completion of the operation when the pressure sensor is removed from the subterranean function. In certain embodiments of the present invention, the incorporation of a pressure sensor into the tool assembly 10 may permit an operator to evaluate conditions in the subterranean formation F (which conditions may include, but are not limited to, parameters related to the creation or enhancement of the fracture) in real time or near-real-time, and, inter alia, to undertake a remediative step in real time or near-real-time. Example of remediative steps include, inter alia, swapping from a proppant-laden fluid to a linear fluid, reducing the concentration of a proppant present in the fluid, and reducing the viscosity of the fluid. In certain embodiments of the present invention, the operator may be able to determine, in real-time, that the fracture in the subterranean formation has been created or enhanced to a desired extent. In certain embodiments, the operator may move tool assembly 10 to a different zone in the same, or different, formation after determining, in real time, that the fracture has been created or enhanced to a desired extent. As referred to herein, the term "real time" will be understood to mean a time frame in which the occurrence of an event and the reporting or analysis of it are almost simultaneous; e.g., within a maximum duration of not more than two periods of a particular signal (e.g., a pressure signal, electrical signal, or the like) being evaluated. For example, an operator may view, in real time, a plot of the pressure in the formation F that has been transmitted by the optional pressure sensor (not shown), and determine, at a particular time during the fracturing operation, that an increase, or increases, in the slope of the pressure indicate the need to perform a remediative step such as those described above. One of ordinary skill in the art, with the benefit of this disclosure, will be able to evaluate a real time plot of the pressure in the formation F, and evaluate conditions in the formation F, and determine the appropriate remediative step to perform in response.

Optionally, an operator may elect to employ a tension indicator (not shown) in the tool assembly 10. Generally, the inclusion of a tension indicator may provide an operator with a broad variety of information. In certain embodiments of the present invention, the inclusion of a tension indicator may enable an operator to identify, inter alia, whether packer 16 has been completely set, or completely unset. In certain embodiments of the present invention, the inclusion of a tension indicator may enable an operator to identify, inter alia, the location within a well where an obstruction may be hindering the ability to move packer 16; in certain embodiments of the present invention, these identifications, and the determination of other similar parameters, may be made in real time. For example, an operator may view a real time plot of the tension sensed by the tension indicator, and determine, upon detection of an increase or decrease in the tension, that the packer has become unset, or, as another example, that the tension sensed by the tension indicator has increased sufficiently to suggest that the mechanical integrity of tool assembly 10 may be imperiled. In certain embodiments, the operator may undertake a remediative step after making such real time determination or identification. An example of a remediative step includes, but is not limited to, raising or lowering the coiled or jointed tubing 22 without unsetting the packer 16. One of ordinary skill in the art, with the benefit of this disclosure, will be able to evaluate a real time plot of the tension and determine the appropriate remediative step to perform in response.

Optionally, an operator may elect to include a variety of other components in the tool assembly 10 upstream, or above, the sub 18, as well as between the sub 18 and the connector 20. For example, an operator may elect to employ a battery pack, a blast joint, a centralizer, a casing collar locator, a release joint, a down hole controller unit, a down hole motor and/or turbine, a mud pulse collar, a clock for time-stamping data, and the like. Since these components are conventional, they are not shown, nor will they be described in detail.

After the packer 16 and the sub 18 are positioned in the casing 12 in the manner described above, they may be set in any conventional manner so that the above-mentioned packer elements and anchor mechanisms engage the inner surface of the casing 12 to form a seal.

A fluid then may be pumped from the ground surface, at a relatively high pressure, through the tubing 22. In certain embodiments, the fluid may be pumped through the tubing 22 at a pressure in the range of from about 500 psi to about 5,000 psi. In certain embodiments, the fluid may be a conventional fluid that comprises an abrasive particulate material, but that is not a low-molecular weight fluid. In certain other embodiments, the fluid may be a low-molecular-weight fluid that comprises an abrasive particulate material. In certain other embodiments, the fluid may be a low-molecular-weight fluid that does not comprise an abrasive particulate material. In certain embodiments wherein an abrasive particulate material is used, the abrasive particulate material may be, e.g., sand, resin coated proppant ("RCP"), and ceramic proppants. The abrasive particulate material may be suspended in a liquid (e.g., water, or chemically-treated water). In certain embodiments, the abrasive particulate material may be present in the fluid in an amount in the range of from about 0.5 to about 1.5 pounds per gallon of fluid. The fluid flows to the sub 18, discharges through the jet openings 25 in the sub 18 and into the annulus 14 at a very high pressure, and impacts against the inner surface of the casing 12 to form perforations 12a through the casing 12. It will be understood that any cement extending between the casing 12 and the well will also be perforated in the above manner, and the perforations 12a thus created may penetrate into the formation F as well as forming indentations therein.

The flow of the fluid then may be terminated and the tool assembly 10 optionally may be cleaned in any conventional manner. In certain embodiments, the flow of the fluid may be terminated at a predetermined time. In certain embodiments, the flow of the fluid may be terminated based upon a change in pressure in the well bore that may indicate that communication to the hydrocarbon reservoir in the formation has been achieved. In certain embodiments of the present invention, the tool assembly 10 may be cleaned by pumping a cleaning fluid down the annulus 14 so that the cleaning fluid enters the lower portion of the tool assembly 10 and flows in a reverse direction upstream through the tool assembly 10, including the sub 18, and the tubing 22. In this context, it will be understood that the sub 18 can be provided with a valve (not shown) that may permit the flow of the fluid downstream through the sub and the jet openings 25 as described above, but also may prevent the cleaning fluid that flows through the sub 18 in the opposite, or reverse, direction from discharging through the jet openings 25.

Fracturing then may be commenced by pumping a low-molecular-weight fluid, at a relatively high pressure, from ground surface through the annulus 14, or through the tubing, or through both the annulus and the tubing contemporaneously, in any conventional manner until the fracturing fluid penetrates the formation F, and, more particularly, the above-mentioned indentations in the formation F, to create or enhance at least one fracture in the formation F. In certain embodiments, an operator may elect to flow a second fluid through the tubing and into the subterranean formation contemporaneously with pumping the low-molecular-weight fluid. In certain embodiments, the second fluid may be a linear gel that comprises polymers and that has a viscosity in the range of from about 10 cp to about 40 cp. The seal formed by the packer 16 permits this flow upstream of its location but prevents the low-molecular-weight fluid from flowing downstream past the packer 16. Flowing the low-molecular-weight fluid down the annulus may eliminate the need to employ an upper packer located above the sub 18, and thereby avoid any problems that may be associated with introducing the low-molecular-weight fluid through a tubing and tool assembly utilizing an upper packer.

Upon completion of this fracturing treatment, the flow of the low-molecular-weight fluid may be terminated and the tool assembly 10 optionally may be cleaned, e.g., by pumping cleaning fluid down the annulus 14 so that the fluid enters the lower portion of the tool assembly 10 and flows upstream through the tool assembly 10, including the sub 18, and the tubing 22 in the manner described above.

Having perforated and fractured a desired interval in the manner described above, an operator may elect to release the packer 16 from its set position as described above and the tubing 22, then move the tool assembly 10 axially in the casing 12 to another desired interval where the above-described method can be repeated. In this context, it will be understood that the tool assembly 10 can include a circulation port to allow fluid circulation from the annulus 14 to the interior of the tool assembly 10 and the tubing 22 to promote the cleaning of the tool assembly 10. In certain embodiments of the present invention wherein an operator uses the methods of the present invention to treat multiple formations, the operator may elect to sequentially treat the formations intersected by the well, beginning with the deepest formation, and sequentially elevating the tool assembly 10 to treat shallower desired intervals.

Accordingly, an example of a method of the present invention is a method for fracturing a portion of a subterranean formation penetrated by a well bore comprising: placing a tool assembly in the well bore to form an annulus between the tool assembly and the walls of the well bore; passing a low-molecular-weight fluid through the tool assembly and towards the walls of the well bore to form openings in the walls; and permitting a low-molecular-weight fluid to flow through the openings and into the formation to create or enhance at least one fracture therein. Optionally, in certain embodiments, the fluid that is passed through the tool assembly and towards the walls of the well bore to form openings in the walls may be a "first" fluid, and the fluid that flows through the openings and into the formation to create or enhance at least one fracture therein may be a "second" fluid, and the first fluid and the second fluid may be the same, or different; in certain of these optional embodiments, the first fluid may comprise an abrasive particulate material.

Another example of a method of the present invention is a method for fracturing a portion of a subterranean formation penetrated by a well bore, comprising: placing a tool assembly in the well bore to form an annulus between the tool assembly and the walls of the well bore; placing a low-molecular-weight fluid into the annulus for flowing into the formation to create or enhance at least one fracture therein; and forming a seal across the annulus to restrict fluid flow in the annulus downstream of the seal and to permit or enhance flow of the low-molecular-weight fluid through the annulus and into the formation.

Another example of a method of the present invention is a method of enhancing production from multiple subterranean formations penetrated by a well bore during a single trip through the well bore, comprising: inserting a tool assembly into the well bore adjacent a desired location in a formation; placing a low-molecular-weight fluid into the formation so as to create or enhance at least one fracture in the formation; relocating the tool assembly within the well bore adjacent another desired location in the same, or different, formation; and repeating the step of placing a low-molecular-weight fluid into the formation so as to create or enhance at least one fracture in the formation.

Yet another example of a method of the present invention is a method of enhancing production from multiple subterranean formations penetrated by a well bore comprising a casing during a single trip through the well bore, comprising: inserting a tool assembly into the casing adjacent a desired location in a formation; forming openings in the casing at the desired location; passing a low-molecular-weight fluid through the openings into the formation so as to create or enhance at least one fracture in the formation; relocating the tool assembly within the casing to another desired location in the same, or different, formation; and repeating the steps of forming openings in the casing and passing the low-molecular-weight fluid through the openings into the formation so as to create or enhance at least one fracture in the formation.

Still another example of a method of the present invention is a method of enhancing production, in real time, from multiple subterranean formations penetrated by a well bore during a single trip through the well bore, comprising: inserting a tool assembly into the well bore adjacent a desired location in a formation; placing a low-molecular-weight fluid into the formation so as to create or enhance at least one fracture in the formation; determining, in real time, at least one parameter related to the creation or enhancement of the fracture; relocating the tool assembly within the well bore to another desired location in the same, or different, formation; and repeating the step of placing a low-molecular-weight fluid into the formation so as to create or enhance at least one fracture in the formation.

Yet another method of the present invention is a method of reducing the cost of enhancing production from multiple formations penetrated by a well bore by stimulating multiple formations, on a single trip through the well bore, with a fluid that minimizes damage to the formation comprising: inserting a tool assembly into the well bore adjacent a desired location in a formation; placing a low-molecular-weight fluid into the formation so as to create or enhance at least one fracture in the formation; relocating the tool assembly within the well bore to another desired location in the same, or different, formation; and repeating the step of placing a low-molecular-weight fluid into the formation so as to create or enhance at least one fracture in the formation; wherein the low-molecular-weight fluid enhances the regain permeability of the formation.

It is understood that variations may be made in the foregoing without departing from the scope of the inventions. For example, the type of packer and jet perforating sub can be varied. Also, the fluid that comprises an abrasive particulate material, after perforating the casing, can flow to the formation F at very high pressure and form indentations, in the form of openings, bores, cracks, or the like, in the formation F to assist in the fracturing process.

Further, the system described above is not limited to vertical wells, but is equally applicable to wells that deviate from the vertical. Moreover, the perforations in the casing can be formed by other methods, such as by using explosive charges. Still further, spatial references, such as "above", "below", "upper", "lower", "outer", "over", "between", "inner", and "vertical" are for the purpose of illustration only and do not limit the specific orientation or location of the structure or flow paths described above.

Although only a few embodiments of this invention have been described in detail above, those skilled in the art will readily appreciate that many other modifications are possible in the embodiments without materially departing from the novel teachings and advantages of this invention. Accordingly, all such modifications are intended to be included within the scope of this invention as defined in the following claims.

What is claimed is:

1. A method for fracturing a portion of a subterranean formation penetrated by a well bore, the well bore having walls, the method comprising:

placing a tool assembly in the well bore to form an annulus between the tool assembly and the walls of the well bore, the tool assembly comprising a packer;

setting the packer to form a seal across the annulus;

passing a fluid through the tool assembly and towards the walls of the well bore to form openings in the walls; and flowing a fluid through the annulus and into the formation to create or enhance at least one fracture in the formation, such that once openings have been formed in the well bore walls, a fluid remains flowing through the openings at, or above, the fracture closure pressure.

2. The method of claim 1 further comprising flowing a fluid through the tool assembly, through the openings, and into the formation to create or enhance at least one fracture therein.

3. The method of claim 1 wherein the tool assembly comprises a sub, and wherein passing the fluid comprises:
introducing the fluid to the sub; and
discharging the fluid from the sub towards the walls of the well bore.

4. The method of claim 3 wherein the well bore comprises a casing disposed therein, wherein passing the fluid further comprises:
passing a fluid to the tool assembly; and
discharging the fluid from the tool assembly towards the casing to form perforations in the casing and to permit the flow of the fluid through the casing.

5. The method of claim 4 wherein the fluid that is passed to the tool assembly comprises an abrasive particulate material.

6. The method of claim 4 wherein passing the fluid to the tool assembly comprises introducing the fluid to the sub, wherein the fluid is discharged from the sub towards the casing.

7. The method of claim 1 wherein the well bore comprises a casing disposed therein, wherein passing the fluid further comprises:
passing a fluid to the tool assembly; and
discharging the fluid from the tool assembly towards the casing to form perforations in the casing and to permit the flow of the fluid through the casing.

8. The method of claim 7 wherein the fluid that is passed to the tool assembly comprises an abrasive particulate material.

9. The method of claim 1 further comprising:
moving the tool assembly within the well bore to another location in the same, or different, formation;
passing a fluid through the tool assembly and towards the walls of the well bore to form openings in the walls; and
flowing a fluid through the annulus and into the formation to create or enhance at least one fracture in the formation, such that once openings have been formed in the well bore walls, a fluid remains flowing through the openings at, or above, the fracture closure pressure.

10. The method of claim 9 wherein the packer is set prior to passing the fluid; and further comprising:
releasing the packer after flowing the fluid through the annulus, through the openings, and into the formation to create or enhance at least one fracture therein; and
re-setting the packer to reform the seal after moving the tool assembly within the well bore.

11. The method of claim 1 wherein the tool assembly is connected to a pipe string, and further comprising raising, or lowering the pipe string, without unsetting the packer.

12. A method of enhancing production from multiple subterranean formations penetrated by a well bore during a single trip through the well bore, the well bore having walls, the method comprising:
placing a tool assembly into the well bore adjacent a desired location in a formation, an annulus being formed between the tool assembly and the walls of the well bore, the tool assembly comprising a packer;
setting the packer to form a seal across the annulus;
passing a fluid through the tool assembly and towards the walls of the well bore to form openings in the walls;
flowing a fluid through the annulus and into the formation to create or enhance at least one fracture in the formation, such that once openings have been formed in the well bore walls, a fluid remains flowing through the openings at, or above, the fracture closure pressure;
releasing the packer after flowing the fluid;
relocating the tool assembly within the well bore; and
repeating the steps of setting the packer to form a seal across the annulus, passing the fluid, and flowing a fluid through the annulus and into the formation to create or enhance at least one fracture in the formation, such that once openings have been formed in the well bore walls, a fluid remains flowing through the openings at, or above, the fracture closure pressure.

13. The method of claim 12 further comprising flowing a fluid through the tool assembly and into the formation after the openings have been formed in the walls of the well bore, wherein a particulate material is not present in the fluid.

14. The method of claim 12 wherein the tool assembly comprises a sub, and wherein passing the fluid comprises:
introducing the fluid to the sub; and
discharging the fluid from the sub towards the walls of the well bore.

15. The method of claim 14 wherein the well bore comprises a casing disposed therein, wherein passing the fluid further comprises:
passing a fluid to the tool assembly; and
discharging the fluid from the tool assembly towards the casing to form perforations in the casing and to permit the flow of the fluid through the casing.

16. The method of claim 15 wherein the fluid that is passed to the tool assembly comprises an abrasive particulate material.

17. The method of claim 15 wherein passing the fluid to the tool assembly comprises introducing the fluid to the sub, wherein the fluid is discharged from the sub towards the casing.

18. The method of claim 15 wherein the tool assembly is connected to a pipe string, and further comprising raising, or lowering the pipe string, without unsetting the packer.

19. The method of claim 12 wherein the well bore comprises a casing disposed therein, wherein passing the fluid further comprises:
passing a fluid to the tool assembly; and
discharging the fluid from the tool assembly towards the casing to form perforations in the casing and to permit the flow of the fluid through the casing.

20. The method of claim 19 wherein the fluid that is passed to the tool assembly comprises an abrasive particulate material.

21. A method of enhancing production, in real time, from multiple subterranean formations penetrated by a well bore during a single trip through the well bore, the well bore having walls, the method comprising:
placing a tool assembly into the well bore adjacent a desired location in a formation, the tool assembly comprising a packer;
setting the packer to form a seal across the annulus;
passing a fluid through the tool assembly and towards the walls of the well bore to form openings in the walls;
flowing a fluid through the annulus and into the formation to create or enhance at least one fracture in the formation, such that once openings have been formed in the well bore walls, a fluid remains flowing through the openings at, or above, the fracture closure pressure;

determining, in real time, at least one parameter related to the creation or enhancement of the fracture;

releasing the packer;

relocating the tool assembly within the well bore; and repeating the steps of setting the packer, passing the fluid, and flowing a fluid through the annulus and into the formation to create or enhance at least one fracture in the formation, such that once openings have been formed in the well bore walls, a fluid remains flowing through the openings at, or above, the fracture closure pressure.

22. The method of claim 21 wherein the tool assembly comprises a sub, and wherein passing the fluid comprises:

introducing the fluid to the sub; and discharging the fluid from the sub towards the walls of the well bore.

23. The method of claim 22 wherein the well bore comprises a casing disposed therein, wherein passing the fluid further comprises:

passing a fluid to the tool assembly; and discharging the fluid from the tool assembly towards the casing to form perforations in the casing and to permit the flow of the fluid through the casing.

24. The method of claim 23 wherein the fluid that is passed to the tool assembly comprises an abrasive particulate material.

25. The method of claim 23 wherein passing the fluid to the tool assembly comprises introducing the fluid to the sub, wherein the fluid is discharged from the sub towards the casing.

26. The method of claim 21 wherein the well bore comprises a casing disposed therein, wherein passing the fluid further comprises:

passing a fluid to the tool assembly; and discharging the fluid from the tool assembly towards the casing to form perforations in the casing and to permit the flow of the fluid through the casing.

27. The method of claim 26 wherein the fluid that is passed to the tool assembly comprises an abrasive particulate material.

28. The method of claim 21 wherein determining, in real time, at least one parameter related to the creation or enhancement of the fracture comprises determining, in real time, that at least one fracture therein has been created or enhanced to a desired extent.

29. The method of claim 21 wherein relocating the tool assembly within the well bore to another desired location in the same, or different, formation is performed after determining, in real time, that at least one fracture therein has been created or enhanced to a desired extent.

30. The method of claim 21 wherein the tool assembly is connected to a pipe string, and further comprising raising, or lowering the pipe string, without unsetting the packer.

31. The method of claim 21 further comprising performing a remediative step after determining, in real time, at least one parameter related to the creation or enhancement of the fracture.

32. The method of claim 31 wherein the remediative step comprises reducing the concentration of a proppant material present in the fluid.

33. The method of claim 31 wherein the remediative step comprises reducing the viscosity of the fluid.

34. The method of claim 31 wherein the tool assembly is connected to a pipe string, and wherein the remediative step comprises raising, or lowering the pipe string, without unsetting the packer.

* * * * *